United States Patent [19]
Hoy

[11] Patent Number: 6,063,412
[45] Date of Patent: May 16, 2000

[54] EDIBLE ANIMAL GREETING CARDS

[76] Inventor: Stephen B. Hoy, 26575 Oakland St., Roseville, Mich. 48066

[21] Appl. No.: 08/817,278

[22] PCT Filed: Aug. 6, 1996

[86] PCT No.: PCT/US96/13070

§ 371 Date: Apr. 10, 1997

§ 102(e) Date: Apr. 10, 1997

[87] PCT Pub. No.: WO97/05786

PCT Pub. Date: Feb. 20, 1997

Related U.S. Application Data

[60] Provisional application No. 60/001,957, Aug. 7, 1995.

[51] Int. Cl.[7] .............................. A22C 17/00; A23G 1/00
[52] U.S. Cl. .............................. 426/87; 426/104; 426/805
[58] Field of Search .............................. 426/87, 104, 132, 426/383, 805; 40/124.09, 124.11, 124.12, 124.13, 124.17; 281/4, 15.1, 17, 19.1, 19.2, 27

[56] References Cited

U.S. PATENT DOCUMENTS

| | | | |
|---|---|---|---|
| D. 240,770 | 8/1976 | French | D1/1 |
| D. 241,184 | 8/1976 | French | D1/1 |
| 259,915 | 6/1882 | Pratt | 281/19.1 |
| D. 288,062 | 2/1987 | Aronson | D9/332 |
| D. 322,281 | 12/1991 | English | D19/6 |
| 722,418 | 3/1903 | Bach | 281/27 |
| 1,265,926 | 5/1918 | Ludlam | 426/104 |
| 1,791,175 | 2/1931 | Tomlinson | 426/132 |
| 2,012,545 | 8/1935 | Pickering et al. | 281/19.2 |
| 3,107,651 | 10/1963 | Beck | 426/104 |
| 3,548,527 | 12/1970 | Acosta et al. | 40/152.1 |
| 3,589,047 | 6/1971 | Hess | 40/124.1 |
| 3,908,025 | 9/1975 | Miller et al. | 426/623 |
| 4,203,516 | 5/1980 | Stonoga et al. | 206/216 |
| 4,212,896 | 7/1980 | Brown, Jr. et al. | 426/623 |
| 4,362,746 | 12/1982 | Cox | 426/104 |
| 4,670,271 | 6/1987 | Pasternak | 426/90 |
| 4,681,758 | 7/1987 | Fruthaler et al. | 424/78 |

(List continued on next page.)

FOREIGN PATENT DOCUMENTS

| | | | |
|---|---|---|---|
| 337537 | 10/1989 | European Pat. Off. | 426/805 |
| 2834647 A1 | 2/1980 | Germany | 426/5 |
| 4010003 | 2/1991 | Germany | 426/138 |
| 63-291538 | 11/1988 | Japan . | |
| 95/01735 | 1/1995 | WIPO | 426/104 |
| 95/04471 | 2/1995 | WIPO | 426/805 |

OTHER PUBLICATIONS

Sunday Star Magazine, Washington, D.C., Gaines Dog Biscuit Advertisement, Dec. 1955.
Full Text From Dialog Data Base, Money Magazine, v16, p125, Catering to The Educated Palates of Yuppies' Yelpers, Aug. 1987.
Swiss Colony Christmas Gift Book, Reference from Class 426/104, 1982.

*Primary Examiner*—Nina Bhat
*Assistant Examiner*—Sherry A. Dauerman
*Attorney, Agent, or Firm*—Gifford, Krass, Groh, Sprinkle, Anderson & Citkowski, P.C.

[57] ABSTRACT

The present invention is directed to an edible greeting card (10) suitable for ingestion by a pet which comprises at least one substantially rigid edible panel (12) having at least one message region (24) positioned on the front surface and/or back surface of the panel. At least one edible message (30) is provided within the message region and, in a preferred embodiment, a plurality of messages are provided on the edible panels of the greeting card. The edible message has a plurality of characters, each character being sufficiently large so as to be perceived by the average human. In embodiments utilizing two or more panels (12, 18) edible joining devices (26) are utilized to join the panels. The panels are positioned within the vicinity of the pet so that the pet may view and ingest the panels and edible message.

3 Claims, 4 Drawing Sheets

U.S. PATENT DOCUMENTS

| | | | |
|---|---|---|---|
| 4,822,626 | 4/1989 | Spanier et al. | 426/805 |
| 5,017,394 | 5/1991 | Macpherson | 426/302 |
| 5,021,802 | 6/1991 | Allred | 346/1.1 |
| 5,035,907 | 7/1991 | Phillips et al. | 426/383 |
| 5,047,231 | 9/1991 | Spanier et al. | 426/57 |
| 5,089,307 | 2/1992 | Ninomiya et al. | 428/35.2 |
| 5,133,496 | 7/1992 | Davidson et al. | 229/92.8 |
| 5,211,980 | 5/1993 | Cox | 426/601 |
| 5,284,365 | 2/1994 | Stuart | 283/117 |
| 5,296,217 | 3/1994 | Stookey | 424/57 |
| 5,435,840 | 7/1995 | Hilborn | 106/20 R |
| 5,453,122 | 9/1995 | Lyon | 106/20 R |

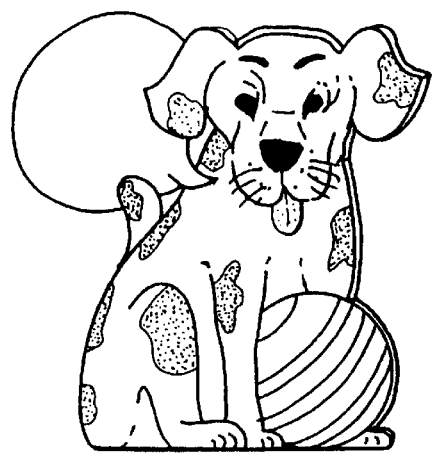
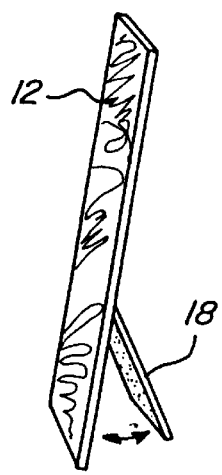
FIG-10A    FIG-10B
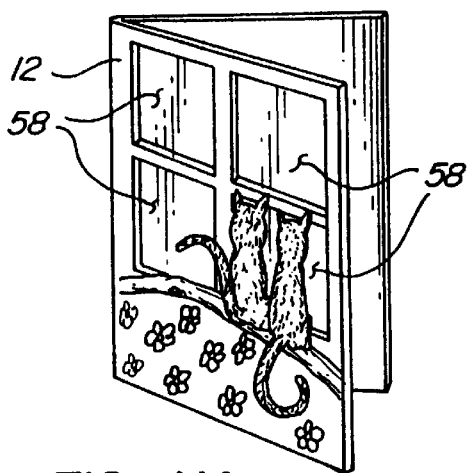
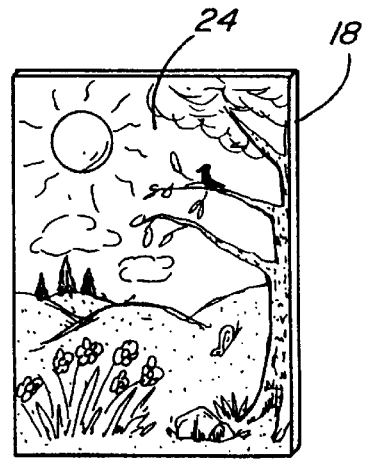
FIG-11A    FIG-11B
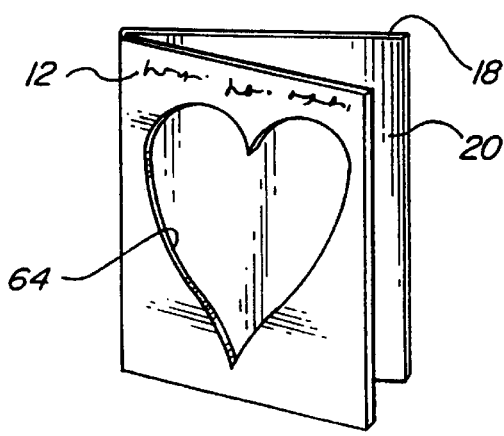
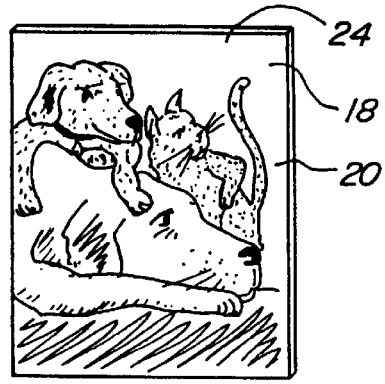
FIG-12A    FIG-12B

EDIBLE ANIMAL GREETING CARDS

CROSS-REFERENCE TO PRIOR APPLICATIONS

This application claims the benefit of U.S. Provisional Application No. 60/001,957 filed Aug. 7, 1995.

FIELD OF THE INVENTION

The present invention relates generally to novelty items for animals, and more particularly to an edible greeting card for pets.

BACKGROUND OF THE INVENTION

Many families have pets which are increasingly treated as members of the family. Many pet owners enjoy including their beloved pets in holiday festivities such as birthdays, Christmas, Easter, Valentine's Day, Thanksgiving, and Halloween. As greeting cards are traditionally given to loved ones on such holidays, many pet owners give greeting cards to their pets or send greeting cards from themselves or their pets to the pets of relatives and close friends. Pets do not appreciate the significance of a typical greeting card and do not get any enjoyment out of receiving such a card. The present invention solves the problem of typical greeting cards by providing an edible greeting card which provides enjoyment to the pet as well as the pet owner and sender of the card.

A variety of patents disclose greeting cards which include gifts or where the card itself may be construed as a gift. U.S. Pat. No. 4,203,516 to Stonoga et al. discloses a novelty greeting card wherein a dog biscuit is contained within a non-edible greeting card particularly configured to hold the dog biscuit. The greeting card disclosed by Stonoga et al. requires the pet owner to remove the pet treat from its protective pocket within the non-edible greeting card prior to ingestion by the pet.

U.S. Pat. No. 5,284,365 to Stuart discloses a greeting card assembly having a removable insert containing a message. The message insert, once removed from the greeting card, may be kept as an ornament such as a Christmas tree ornament or other similar decorative item.

U.S. Pat. No. 3,589,047 to Hess discloses a novelty greeting card comprising a substantially three-dimensional caricature which is collapsible onto a base sheet. The caricature is inflated by blowing air into the caricature through a hole in the base sheet, thus providing a three-dimensional gift in a substantially flat greeting card.

U.S. Pat. No. 5,133,496 to Davidson et al. discloses a combination greeting card and gift pouch. A single sheet is tri-folded into a closed pouch, with adhesive provided along the margins of the sheet, thereby enabling the pouch to be sealed and mailed as a greeting card.

U.S. Pat. No. 3,548,527 to Acosta et al. discloses a card having a pivotable rear panel whereby a photograph or other picture may be placed within the card to attractively mount the photo or picture.

Several U.S. patents disclose items which are ingestible by animals, such as U.S. Pat. No. 4,681,758 to Fruthaler et al., which discloses shaped, flavored articles which are attractive to masticating animals and have the texture, appearance and aroma of natural food materials. U.S. Pat. No. 4,265,916 to Skoch discloses an animal feed supplement in block form. U.S. Pat. No. 4,777,058 to Chandler discloses a composite animal food having a crunchy shell surrounding a deformable core of edible protein and water soluble solids.

While the prior art provides many varieties of animal foods and greeting cards, the prior art does not address the inherent need of pet owners to demonstrate their affection to their pets in a manner similar to that by which they demonstrate their affection to other humans.

There remains a need for a greeting card which the giver, pet owner and pet may enjoy, and the present invention is directed to resolving that need.

SUMMARY OF THE INVENTION

The present invention solves the problem of prior art greeting cards and pet novelty articles in that the giver, pet owner and pet receive enjoyment from the giving and receiving of the edible greeting card.

An edible greeting card suitable for ingestion by a pet such as a horse, dog, cat, rabbit or bird comprises at least one substantially rigid edible panel having a thickness, a perimeter and front and back surfaces. At least one message region is located on the front surface and/or back surface of the substantially rigid edible panel and is positioned within the perimeter of the substantially rigid edible panel.

At least one edible message is provided within at least one message region and in a preferred embodiment, a plurality of messages are provided on the edible panels of the greeting card. The edible message has a plurality of characters, each character being sufficiently large so as to be perceived by the average human. The message regions are configured so as to permit the placement thereupon of at least one edible message, and in the preferred embodiment, the message region is flat.

In embodiments utilizing two or more panels, edible joining means are provided so that one edible panel may be joined to another edible panel, creating a joined structure which may stand upright on a horizontal surface. In a preferred embodiment of the present invention, a flexible rawhide strip is threaded through holes placed proximate to the perimeter of the edible panels. Alternate embodiments may utilize an edible adhesive or flexible edible hinge. Other alternate embodiments of the invention may be constructed of a single member having an indented, perforated or thinner hinge area positioned between two panel areas so that the single member may be folded along the flexible hinge.

The panels are positioned within the vicinity of the pet so that the pet may view and ingest the panels and edible message. In a preferred embodiment of the present invention, at least one supporting section is positioned along and attached to the perimeter of at least one edible panel. Thus, the joined edible panels are supportable upon at least one supporting section on a horizontal surface so that the center of gravity of the joined panels is positioned above the horizontal surface. In a preferred embodiment of the present invention, the supporting section has a thickness which is equal to or greater than the thickness of the substantially rigid edible panel to which it is attached.

In alternate embodiments the greeting card may be suspended from a cage rail by a hook, wire or placed in a holder.

In an alternate embodiment of the present invention, a single rigid edible panel suitable for ingestion by a pet is provided, having at least one message region positioned on the front and/or back surface of the rigid edible panel and at least one edible message relating to the pet positioned within the message region. The rigid edible panel is positioned in the vicinity of the pet so that the pet may ingest the panel and edible message in a manner similar to the multiple-panel greeting card. In a preferred embodiment of the present invention, a wire is provided, the central portion of the wire enclosed in the edible panel such that the ends of the wire extend exteriorly of the edible panel. The wire ends are attachable to one or more rigid projecting members in the vicinity of the pet.

Other objects, advantages and applications of the present invention will be made clear by the following detailed description of a preferred embodiment of the invention. The description makes reference to drawings in which:

BRIEF DESCRIPTION OF THE DRAWINGS

FIG. 10A is a view of another alternate embodiment of the present invention;

FIG. 10B is side view of the embodiment depicted in FIG. 10A;

FIG. 11A is a view of an alternate embodiment of the present invention wherein a panel has a contoured exterior surface:

FIG. 11B is a view of an interior surface of the embodiment depicted in FIG. 11A;

FIG. 12A is a view of an alternate embodiment of the present invention having a cutout: and FIG. 12B is a view of an interior surface of the embodiment depicted in FIG. 12A.

DETAILED DESCRIPTION

The present invention is directed to an edible greeting card suitable for ingestion by a pet, whereby the giving of such a greeting card allows a person to express their affection for the pet while at the same time providing a healthy and enjoyable snack for the pet. In relation to the present invention, "edible" is defined as being readily consumed and digested by vertebrates. While many substances are ingestible by pets, the present invention is intended to provide a healthy and tasty snack for the pet while providing enjoyment to the giver of the greeting card.

Figure 1:
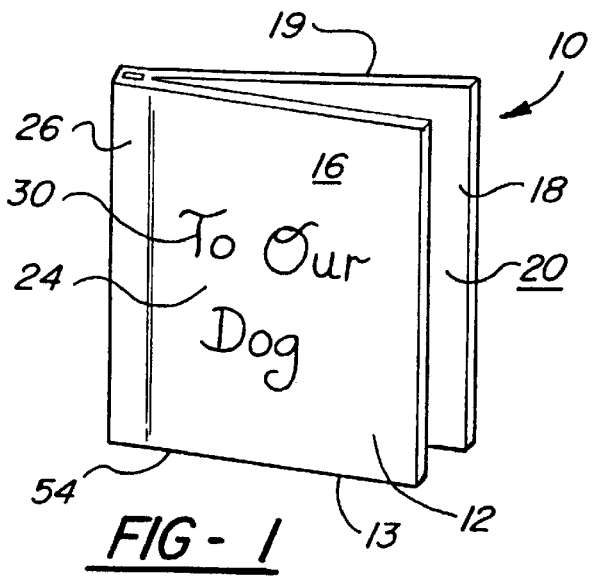
FIG. 1 is a perspective view of a preferred embodiment of the present invention.
Figure 4A:
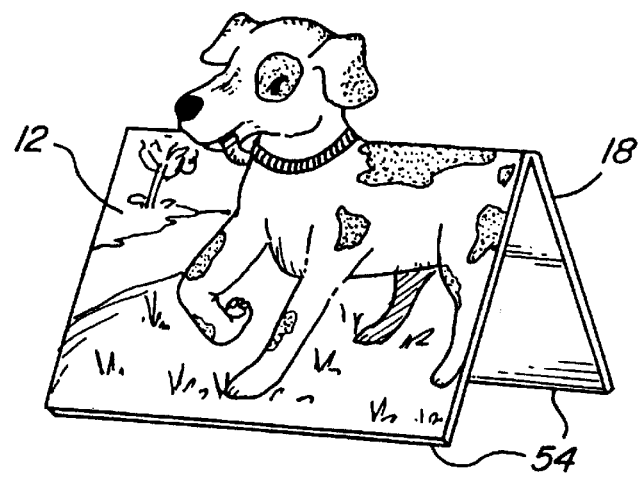
FIG. 4A is a view of an alternate embodiment of the present invention having a cutout.
Figure 4B:
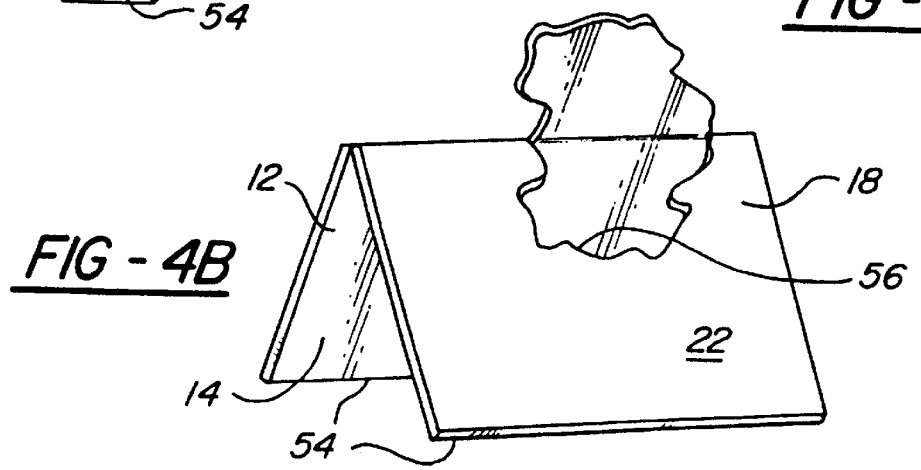
FIG. 4B is the rear view of the embodiment depicted in FIG. 4A.

The invention, shown generally at 10 in FIG. 1, includes a first edible panel 12 and a second edible panel 18, first panel 12 having a perimeter 13, interior surface 14 (see FIG. 5B), exterior surface 16, and a second panel 18 having a perimeter 19, interior surface 20 and exterior surface 22 (see FIG. 4B). In the preferred embodiments the panels are generally rectangular and flat, but may alternately have curved panels which enable a pet to grasp and play with the panels as they are ingesting the greeting card.

Edible panels 12 and 18 may be joined by a variety of means to form a rigid edible greeting card which may be opened to view the interior surfaces 14 and 20 of panels 12 and 18, respectively. As shown in the embodiment depicted in FIGS. 5A and 5B, the perimeter 19 of second edible panel 18 is attached to perimeter 13 of first edible panel 12 via flexible edible hinge 26. In a preferred embodiment hinge 26, comprised of rawhide, has a portion of its perimeter embedded in panels 12 and 18 which are, prior to solidification or hardening of panels 12 and 18, comprised primarily of grains. Alternately, a sticky substance such as molasses or corn syrup may be used as an edible adhesive, permitting the flexible edible hinge to be "glued" to the rigid edible panel.

In a preferred embodiment of the invention depicted in FIG. 1. first edible panel 12, edible hinge 26, and second edible panel 18 are formed from a single continuous material, such as a sheet of rawhide. Hinge 26 preferably has a thinner cross-section than edible panels 12 and 18, giving edible hinge 26 increased flexibility while maintaining sufficient rigidity in edible panels 12 and 18.

Figure 7A:
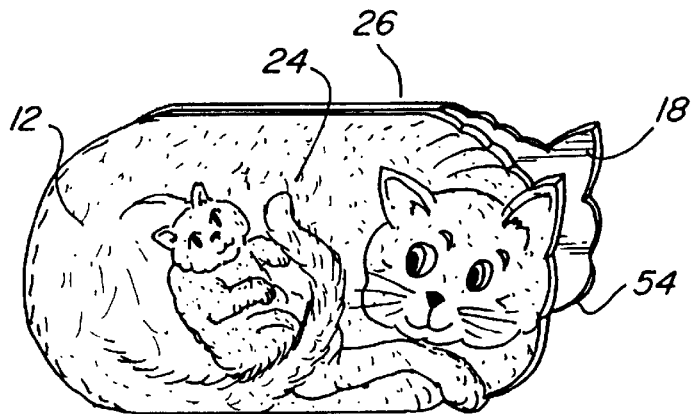
FIG. 7A is a view of an alternate embodiment of the present invention.
Figure 7B:
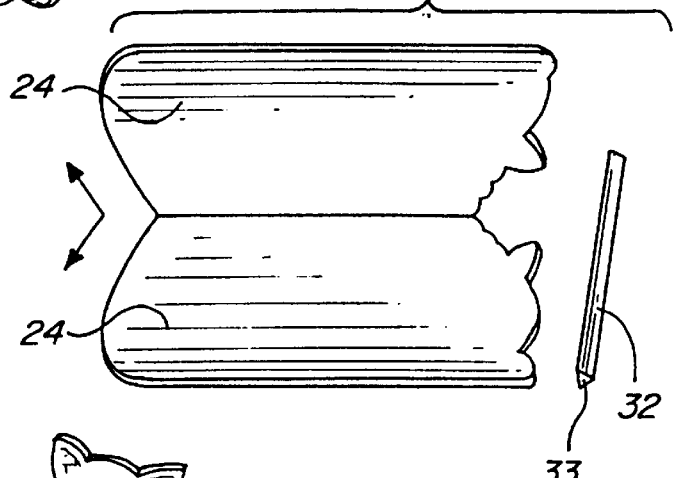
FIG. 7B is a view of the interior surfaces of the embodiment depicted in FIG. 7A.

In an alternate embodiment of the invention, such as depicted in FIGS. 7A and 7B, panels 12 and 18 may be formed from a single continuous section of material made primarily from grains. An indentation or perforation is formed in the continuous section of material between panels 12 and 18, forming their perimeters and hinge 26. The continuous material is then bent along the indentation, thus forming the card as depicted in FIGS. 7A and 7B.

Figure 2:
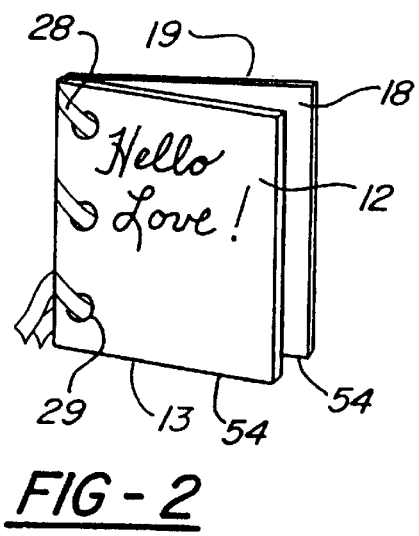
FIG. 2 is a view of an alternate embodiment of the present invention.

In an alternate embodiment depicted in FIG. 2, panels 12 and 18 include a plurality of holes 29 positioned along a portion of respective perimeters 13 and 19. An edible strip 28, preferably rawhide or other flexible edible material, is threaded through holes 29, thus joining edible panels 12 and 18.

Each greeting card 10 has at least one message region 24 positioned on at least one surface of at least one panel. An edible message 30 containing a plurality of characters such as letters, numbers, graphics, symbols or marks, may be placed within message region 24. The characters of message 30 must be large enough to permit visual recognition of the characters by a human without assistance. Stated otherwise, message 30 must be large enough so that the characters of the message are discernable by the human eye. Accordingly, message region 24 must be large enough so as to permit the placement thereupon of a message 30.

The edible message preferably is an edible ink having ingredients selected from the group including corn syrup and glycerine. Nontoxic coloring agents such as FD&C certified colors and other ancillary ingredients such as catnip may be included in the edible ink. A variety of printing techniques may be used to apply the characters of the edible message to the rigid edible panels including silk screening, lithography, laser imprinting and embossing. In selected embodiments such as those utilizing panels of rawhide, the message may be hot stamped into the rawhide utilizing a process similar to that used for imprinting leather goods.

In alternate embodiments, the edible message may be formed of gum paste or other edible food decoration which may then be placed in the message region of the edible panel. Edible food decorations typically comprises ingredients including corn starch, corn syrup, sugar and glycerine. Gum paste typically comprises ingredients including gelatin, gum tragacanth, shortening and glucose.

Alternate embodiments may first place the edible message on an edible decal, sticker, rice paper or wafer paper which is then applied to the message regions of the panels.

Figure 3:
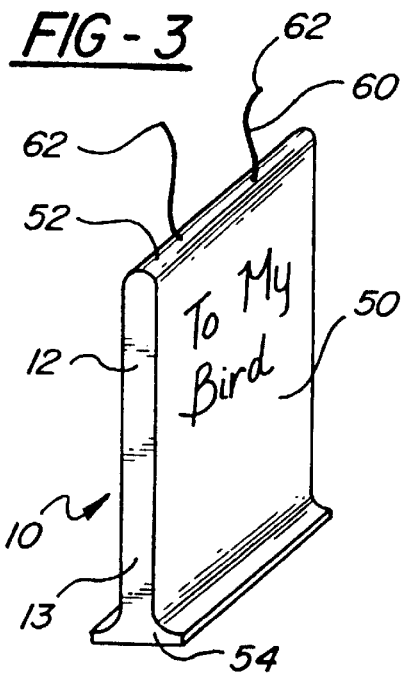
FIG. 3 is a view of an embodiment of the present invention having a single panel.

Greeting card 10 is positioned in the vicinity of the pet so that at least one message 30 is visible to the pet and the pet may ingest the card. In the embodiments depicted in FIGS. 1–4, a supporting section 54 is positioned along and attached to perimeters 13 and 19 of edible panels 12 and 18, thus permitting greeting card 10 to be set on a horizontal surface in the vicinity of the pet, such as the bottom of a cage, a floor or card holder. As depicted in the embodiment of FIG. 3, supporting section 54 is preferably thicker than panel 12, thus assisting greeting card 10 to remain in an upright, erect position on the horizontal surface.

Alternate embodiments may utilize a wire 60 embedded into edible panel 12, allowing wire ends 62 to be wrapped around a rigid projecting member such as a cage bar or hook, thereby suspending greeting card 10 in the vicinity of the pet. The wire 60 may be provided as the sole means for placing the greeting card in the vicinity of the pet, or may be used in conjunction with supporting section 54. A supporting section 54 is preferably utilized for greeting cards ingested by horses dogs and cats, while a wire 60 is preferably utilized for greeting cards ingested by birds or small mammals such as gerbils, hamsters and rabbits.

The greeting card 10 may be suspended from the area within which the pet is kept such as a cage or stall, by mechanisms such as a clip having its free ends embedded in the panel, or a hook constructed of the edible materials which comprise the panel and which is formed integrally with the panel. Alternatively, a holder may be attached to the side of the cage or stall and the greeting card placed within the holder, the card resting on its supporting section.

Figure 5A:
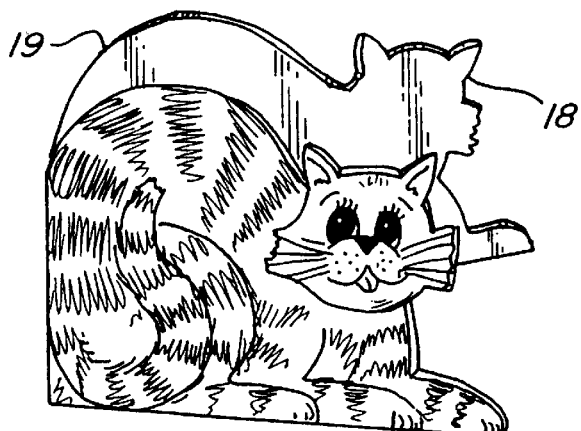
FIG. 5A is a view of another alternate embodiment of the present invention.
Figure 5B:
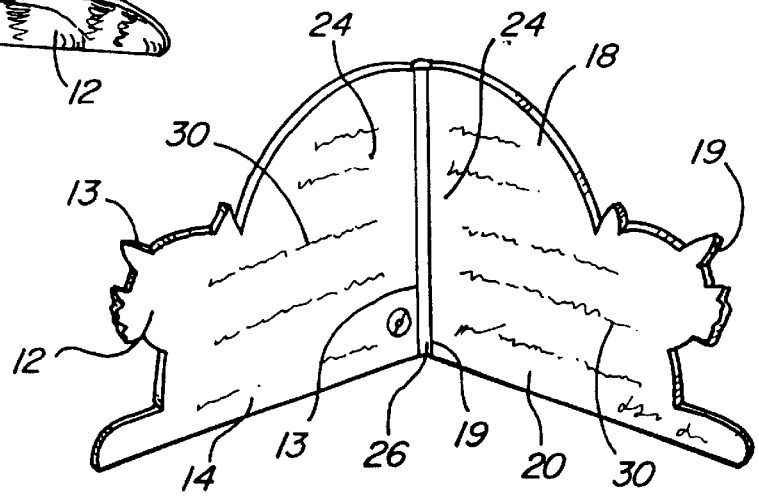
FIG. 5B is a view of the interior surfaces of the embodiment of the invention depicted in FIG. 5A.

The perimeters 13 and 19 of the edible panels may be variously configured so as to provide a visually pleasing greeting card. As depicted in FIG. 4A, first 20 panel 12 is configured so that a portion of first panel 12 projects above second panel 18. As shown in FIG. 4B, the extending portion of panel 12 may be mirrored in a cutout 56 of panel 18. The perimeters and thickness of panels 12 and 18 may be configured so as to enhance the ability of the pet to ingest the greeting card 10. As shown in FIGS. 5A and 5B, messages 30 may be displayed in message region 24 on the interior surfaces 14 and 20 of panels 12 and 18.

As depicted in FIGS. 7A and 7B, some of the message regions 24 provided on greeting card 10 may be left blank so that the giver of the greeting card 10 may personalize the card. A marker 32 is provided which contains edible ink having ingredients selected from the group including corn syrup and glycerine. Nontoxic coloring agents such as FD&C certified colors and other ancillary ingredients such as catnip may be included in the edible ink. Marker 32 has a tip 33 configured to apply a line of edible ink onto message regions 24.

Figure 8:
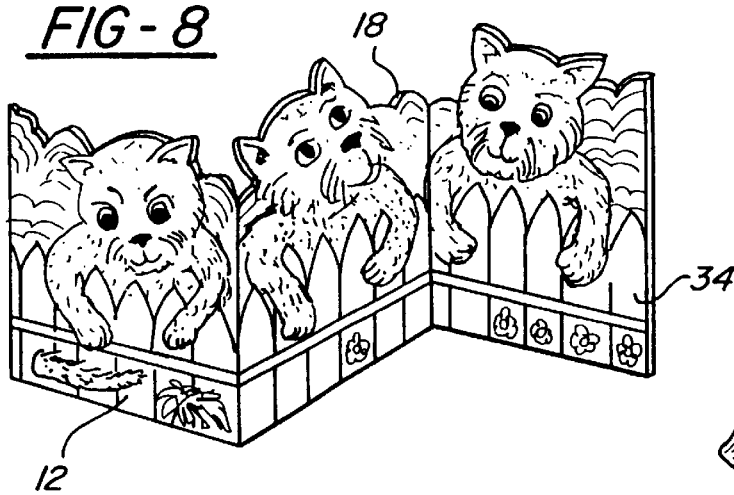
FIG. 8 is a view of an alternate embodiment of the present invention wherein three edible rigid panels are utilized.

FIG. 8 shows an alternate embodiment of the present invention wherein a third panel 34 is utilized in conjunction with first panel 12 and second panel 18, the panels being joined to create a tri-fold greeting card having messages 30 displayed thereupon.

Figure 9:
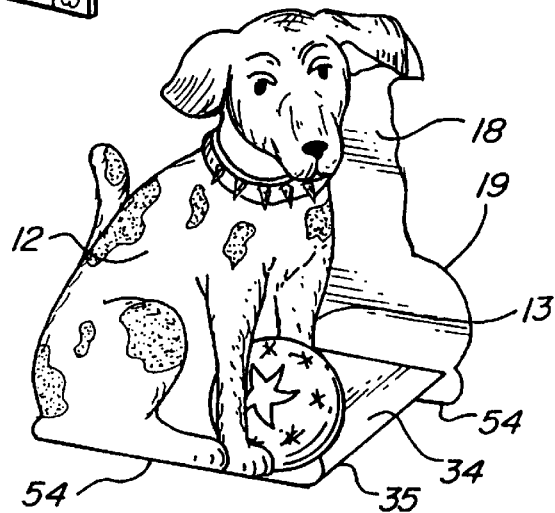
FIG. 9 is a view of an alternate embodiment of the present invention which utilizes three rigid edible panels.

An alternate embodiment of the present invention shown in FIG. 9 utilizes a third panel 34 to provide additional stability between first panel 17 and second panel 18. enabling greeting card 10 to stand upright on a horizontal surface. As shown in FIG. 9, supporting sections 54 are positioned along perimeter 13 of first panel 12, perimeter 35 of third panel 34, and perimeter 19 of second panel 18.

The embodiments depicted in FIGS. 10A and 10B utilize second panel 18 primarily as a support for first panel 12. In this embodiment message regions 24 are preferably only placed on panel 12. In the embodiment depicted in FIGS. 10A and 10B, a tab and slot arrangement may be utilized to attach first panel 12 and second panel 18.

As shown in FIG. 11A, cutouts 58 may be formed in first panel 12, enabling a viewer to see the interior surface 20 of second panel 18, shown in FIG. 11B. In the embodiment shown in FIG. 12A, first panel 12 may be sufficiently thick so as to enable a pattern having a depth to be integrally formed into first panel 12. The heart-shaped depression 64 may additionally be utilized as a message region 24. Depressions having a variety of shapes may be utilized, such as rectangles, ovals, and other geometric shapes.

Figure 6A:
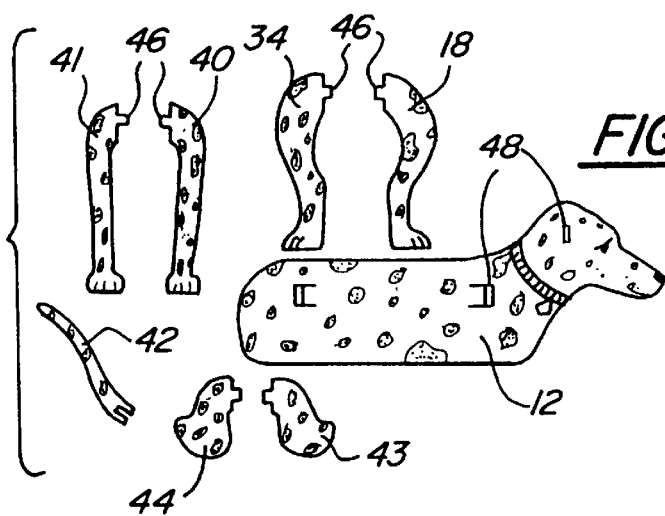
FIG. 6A is a view of an alternate embodiment of the present invention in a disassembled state.
Figure 6B:
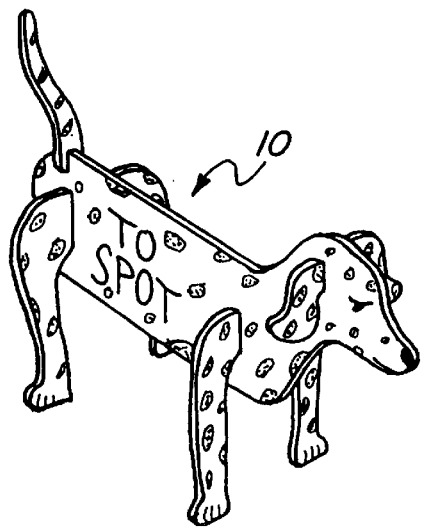
FIG. 6B is a view of the embodiment of FIG. 6A properly assembled.

An alternate embodiment of the invention, shown in FIGS. 6A and 6B, may include additional panels such as fourth panel 40, fifth panel 41, sixth panel 42, seventh panel 43 and eighth panel 44. The embodiment depicted in FIG. 6A is the unassembled version of the greeting card 10, the various panels including tabs 46 and slots 48 which permit assembly of the various panels into the greeting card depicted in FIG. 6B.

While selected embodiments of the edible panels of the present invention may be constructed of a single substance such as rawhide, alternate embodiments of the panels may be constructed from a variety of ingredients such as grains, minerals and seeds. The ingredients of the panels described herein will vary depending on the animal for which the greeting card is intended. The panels may include ancillary ingredients such as binding agents, vitamins flavorings and colors to enhance the manufacturability, rigidity, palatability and nutritional value of the greeting card.

A preferred group of ingredients for edible panels are grains wherein the ingredients for an edible panel include a member of the group consisting of corn, oats, alfalfa, wheat, soy and combinations thereof. The form of the grain, such as rolled, crimped, ground, dehydrated or milled, will vary depending on the animal for which the greeting card is intended and the requirements of the process by which the greeting card is manufactured. An alternate group of ingredients for edible panels are based upon minerals wherein the ingredients for an edible panel include a member from the group consisting of calcium, limestone, salt and combinations thereof.

If the greeting card is intended for ingestion by a horse, the ingredients of the substantially rigid edible panels will preferably include a member of the group consisting of oats, corn, wheat, soy, alfalfa or combinations thereof. In a preferred embodiment, rolled or crimped oats are included. The panels may additionally include a binding agent such as molasses, and vitamin additives and minerals such as salt or ground limestone may be added to enhance the nutritional value or palatability of the edible greeting card.

Greeting cards intended for small mammals such as rabbits, hamsters, gerbils, and guinea pigs preferably include an ingredient which is a member of the group consisting of alfalfa, corn, rice and combinations thereof. Preferably, the grain utilized is dehydrated, milled or flaked. In a preferred embodiment, the edible panels will include flaked corn. Vegetables such as dehydrated carrots and seeds such as safflower seeds or milo seeds are preferably included as additives in the edible panels for small mammals.

For greeting cards suitable for ingestion by birds, the edible panels preferably include an ingredient which is a member of the group consisting of corn, millet, alfalfa and combinations thereof. In an alternate embodiment, the panels include a mineral selected from the group consisting of calcium, salt, magnesium, ferrous carbonate, zinc oxide and combinations thereof. In a preferred embodiment, the edible panel includes calcium sulfate and salt.

If the greeting card is intended for ingestion by a feline, the edible panels preferably include a grain selected from the group consisting of corn, wheat, rice and combinations thereof. In a preferred embodiment, ground yellow corn is utilized as an ingredient of the edible panel. Additives such as poultry by-products, fish meal, catnip and fish oil may be included in the edible panels. In an alternate embodiment, catnip is provided in a liquid or flake form which may be applied to the greeting card by the pet owner.

If the recipient of the greeting card is canine, rawhide is a preferred choice for the panels of the greeting card of the present invention. Alternate embodiments of greeting cards suitable for ingestion by dogs includes an ingredient selected from the group consisting of corn, wheat, rice and combinations thereof. Alternate embodiments of the greeting cards may include ingredients which are particularly chosen to meet the special dietary needs of selected groups of dogs, such as dogs having food allergies and weight problems. For example, a greeting card having lamb and rice as the primary ingredients are suitable for dogs having food allergies.

The thickness of the edible greeting card 10 will vary depending upon the materials used to construct the edible panels 12 and 18 and the type of animal to which the greeting card is being sent. The panels 12 and 18 must be sufficiently thin to allow the receiving pet to bite and chew the greeting card. In a greeting card for a dog, a preferred thickness is 0.25 inches, the thickness of such a card ranging between 0.125 inches for smaller dogs weighing under 20 pounds and 0.50 inches for larger dogs weighing over 65 pounds. For very large dog breeds weighing over 100 pounds, a thickness of greater than 0.50 inches may be preferred.

The thickness of edible panels utilized in greeting cards for felines preferably range between 0.125 and 0.25 inches thick. Edible greeting cards for birds preferably have thicknesses of approximately 0.25 inches for panels constructed of seeds and the like, while panel thicknesses of up to 1 inch or more may be acceptable for greeting cards constructed of minerals such as calcium sulfate. Greeting cards directed to horses are preferably constructed of panels having thicknesses of one inch and above.

Having described the various embodiments of the present invention with reference to the accompanying figures, it will be appreciated that various changes and modifications can be made without departing from the scope or spirit of the invention.

I claim:

1. An edible greeting card suitable for ingestion by a pet, comprising:

a rawhide panel having a front surface and a back surface; and at least one graphical image of a pet and at least one textual message, both formed on the front surface of the rawhide panel using an edible ink suitable for ingestion by a pet;

whereby the image in conjunction with the message give a purchaser the impression that a pet is the intended recipient of the card.

2. The edible greeting card of claim 1 further comprising: at least two substantially rigid panels; edible joining means suitable for ingestion by the pet, wherein said joining means joins one substantially rigid edible panel to at least one other substantially rigid edible panel.

3. The edible greeting card of claim 2, wherein at least two substantially rigid edible panels further include a plurality of holes for joining, the edible joining means comprising a flexible rawhide strip threaded through the holes of the substantially rigid edible panels.

\* \* \* \* \*